No. 635,925. Patented Oct. 31, 1899.
W. J. GINDELE.
MACHINE FOR PREPARING FININGS.
(Application filed Jan. 16, 1899.)
(No Model.)
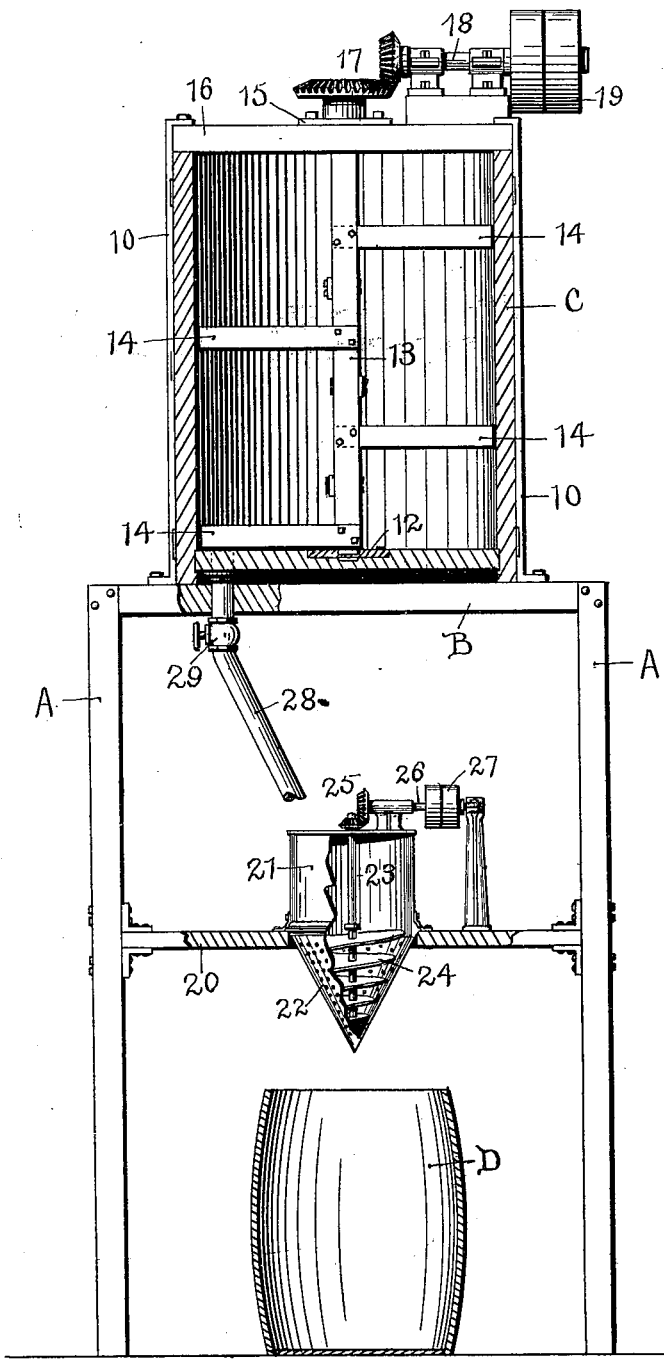

UNITED STATES PATENT OFFICE.

WILLIAM J. GINDELE, OF WORCESTER, MASSACHUSETTS.

MACHINE FOR PREPARING FININGS.

SPECIFICATION forming part of Letters Patent No. 635,925, dated October 31, 1899.

Application filed January 16, 1899. Serial No. 702,271. (No model.)

*To all whom it may concern:*

Be it known that I, WILLIAM J. GINDELE, a citizen of the United States, residing at Worcester, in the county of Worcester and State of Massachusetts, have invented a new and useful Machine for Preparing Finings, of which the following is a specification.

My invention relates to a machine for preparing that form of gelatin which is known as "finings" and which is extensively employed for clarifying beer and other beverages; and the object of my invention is to provide a simple, efficient, and inexpensive machine by means of which finings may be prepared by a simple and direct process and without the employment of the heavy manual labor now ordinarily required.

To these ends my invention consists of the parts and combinations of parts, as hereinafter described, and more particularly pointed out in the claims at the end of this specification.

The accompanying drawing shows a side view, partially broken away, of a machine constructed according to my invention for preparing finings.

In most breweries the finings employed for clarifying beer are now ordinarily mixed by hand. In the usual practice the isinglass or other form of gelatin is treated in an open mixing-vat with a small quantity of acid and a comparatively large volume of water. As the isinglass swells, or "grows," as it is termed, it is essential that the mixture should be constantly stirred; otherwise the finings will be comparatively lumpy and will not have the necessary lightness and uniformity to produce the desired results, to say nothing of the fact that if the mixture is not sufficiently stirred the amount of finings produced from a given amount of isinglass will be comparatively small. It has heretofore ordinarily been the practice to stir these finings during their preparation by means of paddles or stirring-blades, and after the finings are mixed in this manner it is now ordinarily the custom to let the mixture set until required for use, when the desired quantity of finings is usually bailed out of the mixing-vat and is brushed or forced by the hand through a screen and is then used for clarifying the beer or other beverages in the ordinary manner. This ordinary practice of preparing finings is comparatively slow and laborious, and on account of the fact that the finings are not necessarily thoroughly stirred while being prepared and are in some cases allowed to settle or jelly too solidly before screening I have found the present practice to be comparatively wasteful and not productive of a uniform or high grade of finings. To overcome these defects, I propose to employ a machine for preparing finings in which the mixing-vat is provided with simple and efficient means for mechanically stirring its contents and to combine a screen with said mixing-vat, so that as soon as the contents of the mixing-vat are sufficiently stirred the finings may flow by gravity and be at once forced through a screen. Furthermore, I contemplate employing a conical screen with a conical feeding-screw for forcing the finings through the screen, so that the entire apparatus will be automatic and will not require manual labor to operate the same.

Referring to the drawing and in detail, A designates a framework. Mounted on the upper platform B of the frame A is a cylindrical mixing-vat C. Journaled in a step 12 in the bottom of the mixing-vat and in a box 15, carried by a cross-bar 16, is a vertical shaft 13. The mixing-vat is preferably of as strong and substantial construction as possible and is rigidly fastened onto the platform B by straps or irons 10. The central portion of the vertical shaft 13 is preferably square in cross-section, and bolted onto the said vertical shaft 13 are a plurality of beating-arms 14. The successive beating-arms 14 are staggered or offset from each other and extend from the vertical shaft substantially to the side of the vat C, so as to leave comparatively little space between the ends of the beating-arms and the sides of the vat in which the finings can collect or make a permanent deposit. The vertical shaft 13 is driven from tight and loose pulleys 19, carried by a driving-shaft 18, which shaft 18 is connected to the vertical shaft 13 by means of bevel-gears 17.

Secured on a platform 20, carried by the framing A below the platform B, is a screen for mechanically screening the finings. As illustrated, this screen comprises a cylindrical section 21 and a conical screen-section 22, detachably connected thereto. Journaled in the screen is a vertical shaft 23, carrying a tapering screw 24 for forcing the finings through the perforations in the screen 22. The vertical shaft 23 is turned by bevel-gears 25, carried by a shaft 26, having tight and loose pulleys 27 thereon.

Extending down from the mixing-vat C is a pipe 28, having a valve 29, which can be opened to permit the mixed finings to flow by gravity from the mixing-vat into the screen, the parts being so proportioned that the conical screw 24 will have sufficient capacity to mechanically force the finings through the conical screen as fast as the same flow down through the pipe 28.

Finings prepared in this manner may be run into barrels D, and as the finings are thoroughly screened and mixed they may be kept for a long time without becoming unduly thickened or lumpy.

I am aware that changes may be made in the construction of my machine for preparing finings by those who are skilled in the art without departing from the scope of my invention as expressed in the claims. I do not wish, therefore, to be limited to the form which I have herein shown and described; but What I do claim, and desire to secure by Letters Patent of the United States, is—

1. In an apparatus for preparing finings, the combination of a closed-bottomed mixing-vat, connections for stirring the contents of said mixing-vat by power, whereby gelatin may be treated with acid and expanded to the desired extent while retained in the mixing-vat, a screen, a valve-controlled pipe extending down from the mixing-vat to the screen for delivering the contents of the mixing-vat to the screen by gravity, a conical feed-screw journaled in said screen concentrically therewith and connections for applying power to the feed-screw to force the finings through the perforations of the conical screen, substantially as described.

2. In an apparatus for preparing finings, the combination of a framework A, a closed-bottomed mixing-vat C supported on the upper part of said framing, a vertical square shaft 13 journaled concentrically in said mixing-vat, a plurality of beating-arms 14 secured to the shaft so as to be staggered or offset with respect to each other, a bevel-gear connection for turning the shaft by power, whereby gelatin may be treated with acid in the mixing-vat and expanded to the desired extent, a conical screen 22 supported in the framework A below the mixing-vat, a valve-controlled pipe 28 leading down from the mixing-vat to deliver the contents of the mixing-vat to the screen by gravity, and a conical screw and bevel-gear connection for forcing the finings through the perforations of the conical screen, substantially as described.

In testimony whereof I have hereunto set my hand in the presence of two subscribing witnesses.

WILLIAM J. GINDELE.

Witnesses:
LOUIS W. SOUTHGATE,
PHILIP W. SOUTHGATE.